(12) United States Patent
Kato et al.

(10) Patent No.: US 8,531,716 B2
(45) Date of Patent: Sep. 10, 2013

(54) DUPLICATE SETTING PREVENTION SYSTEM FOR IMAGE PROCESSING APPARATUS

(75) Inventors: Masashi Kato, Nagoya (JP); Toru Tsuzuki, Okazaki (JP); Hiroyuki Yamamoto, Nagoya (JP); Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1306 days.

(21) Appl. No.: 11/691,796

(22) Filed: Mar. 27, 2007

(65) Prior Publication Data
US 2007/0229897 A1    Oct. 4, 2007

(30) Foreign Application Priority Data
Mar. 31, 2006  (JP) ................................ 2006-098986

(51) Int. Cl.
*G06K 15/00*  (2006.01)

(52) U.S. Cl.
USPC ......... 358/1.16; 358/1.15; 358/1.14; 358/1.1; 709/220; 709/221; 709/222; 709/224; 709/226

(58) Field of Classification Search
None
See application file for complete search history.

(56) References Cited

U.S. PATENT DOCUMENTS

| | | | | |
|---|---|---|---|---|
| 5,974,454 | A * | 10/1999 | Apfel et al. | 709/221 |
| 6,766,332 | B2 * | 7/2004 | Miyazaki et al. | 1/1 |
| 7,146,412 | B2 * | 12/2006 | Turnbull | 709/220 |
| 7,289,238 | B2 * | 10/2007 | Sato | 358/1.15 |
| 7,333,226 | B2 * | 2/2008 | Fujiwara | 358/1.15 |
| 7,372,590 | B2 * | 5/2008 | Kuroda | 358/1.15 |
| 7,373,392 | B2 * | 5/2008 | Nishihara et al. | 709/217 |
| 7,511,848 | B2 * | 3/2009 | Crosier et al. | 358/1.15 |
| 7,626,716 | B2 * | 12/2009 | Hayashi | 358/1.15 |
| 7,636,172 | B2 * | 12/2009 | Akiyoshi et al. | 358/1.13 |

(Continued)

FOREIGN PATENT DOCUMENTS

| | | |
|---|---|---|
| JP | 5-088425 A | 4/1993 |
| JP | 7-271520 | 10/1995 |

(Continued)

OTHER PUBLICATIONS

JP Office Action dtd Mar. 16, 2009, JP Appln. 2006-098986.

*Primary Examiner* — Hilina K Demeter
(74) *Attorney, Agent, or Firm* — Banner & Witcoff, Ltd.

(57) ABSTRACT

A duplicate setting prevention system for an image processing apparatus includes a setting file, a set of history information, a determination unit, a setting unit, a prohibiting unit, and a history information recording unit. The setting file is stored in a removable memory removably mounted on an image processing apparatus and is for setting the image processing apparatus. The set of history information is stored in the removable memory and indicates that the image processing apparatus has been set based on the setting file. When the removable memory is mounted on the image processing apparatus, the determination unit reads out the history information set and determines that a setting has been performed to the image processing apparatus based on the setting file. The setting unit performs the setting to the image processing apparatus based on the setting file. The prohibiting unit prohibits the setting unit from performing the setting to the image processing apparatus when the determination unit determines that the setting has been performed to the image processing apparatus based on the setting file. The history information recording unit records, in the history information set of the removable memory, that the setting is performed to the image processing apparatus after the setting unit has completed the setting based on the setting file.

6 Claims, 5 Drawing Sheets

(56) References Cited

U.S. PATENT DOCUMENTS

| | | | |
|---|---|---|---|
| 7,777,909 B2* | 8/2010 | Sato | 358/1.15 |
| 7,804,617 B2* | 9/2010 | Kasamatsu | 358/1.16 |
| 7,836,158 B2* | 11/2010 | Kasatani | 709/220 |
| 7,839,530 B2* | 11/2010 | Fujiwara | 358/1.15 |
| 2002/0149791 A1* | 10/2002 | Ozawa et al. | 358/1.16 |
| 2002/0163665 A1* | 11/2002 | Iwata et al. | 358/1.15 |
| 2003/0208565 A1* | 11/2003 | Nishihara et al. | 709/219 |
| 2004/0017580 A1* | 1/2004 | Kuroda | 358/1.13 |
| 2004/0075857 A1* | 4/2004 | Akiyoshi et al. | 358/1.13 |
| 2005/0162669 A1* | 7/2005 | Park et al. | 358/1.1 |
| 2005/0179926 A1* | 8/2005 | Nishikawa et al. | 358/1.13 |
| 2005/0231756 A1* | 10/2005 | Maeshima | 358/1.15 |
| 2006/0087680 A1* | 4/2006 | Maeda | 358/1.15 |
| 2006/0232819 A1* | 10/2006 | Kasamatsu | 358/1.15 |
| 2007/0177232 A1* | 8/2007 | Takeuchi | 358/504 |
| 2007/0253035 A1* | 11/2007 | Takesada | 358/468 |

FOREIGN PATENT DOCUMENTS

| | | |
|---|---|---|
| JP | 2001-117778 | 4/2001 |
| JP | 2005-109866 A | 4/2005 |
| JP | 2005-236689 A | 9/2005 |
| JP | 2005-311907 A | 11/2005 |

* cited by examiner

- SETTING FILE — 4
- HISTORY FILE — 5

| FILE NAME OF SETTING FILE | SERIAL NUMBER |
|---|---|
| CD91D40A-B9D8-475f-92C0-BAD6D71E5792.set | 00001 |
| CD91D40A-B9D8-475f-92C0-BAD6D71E5792.set | 00002 |
| CD91D40A-B9D8-475f-92C0-BAD6D71E5792.set | 00245 |
| D155AE5A-5A9E-465b-AD18-B27AFF88365C.set | 00002 |
| 1BC7500D-C962-40c5-995A-6C104678B5F2.set | 00002 |
| 1BC7500D-C962-40c5-995A-6C104678B5F2.set | 00003 |
| 1BC7500D-C962-40c5-995A-6C104678B5F2.set | 00004 |
| 1BC7500D-C962-40c5-995A-6C104678B5F2.set | 12345 |
| 1BC7500D-C962-40c5-995A-6C104678B5F2.set | 33333 |
| 1BC7500D-C962-40c5-995A-6C104678B5F2.set | 40286 |
| 1BC7500D-C962-40c5-995A-6C104678B5F2.set | 83964 |

GUID

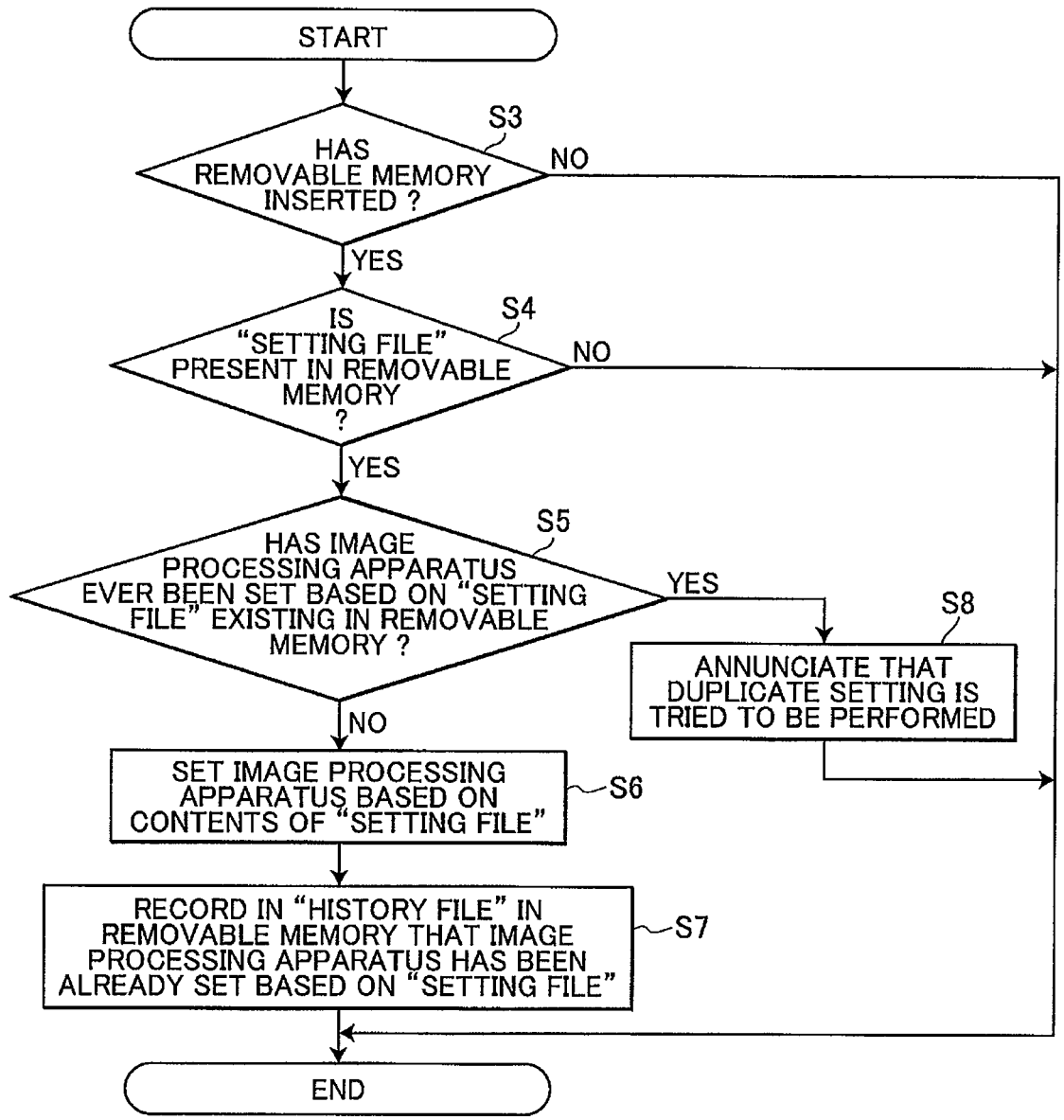

DUPLICATE SETTING PREVENTION SYSTEM FOR IMAGE PROCESSING APPARATUS

CROSS REFERENCE TO RELATED APPLICATIONS

This application claims priority from Japanese Patent Application No. 2006-098986 filed Mar. 31, 2006. The entire content of priority application is incorporated herein by reference.

TECHNICAL FIELD

The present invention relates to a duplicate setting prevention system for an image processing apparatus, an image processing apparatus and a computer readable storage medium that stores a duplicate setting prevention program for the image processing apparatus.

BACKGROUND

An image processing apparatus such as a fax machine and a copying machine includes operation keys and a display. When changing any setting of the image processing apparatus, a setting change menu is displayed on the display. A user changes the setting by operating the operation keys with viewing the menu. By changing the setting, for example, the direction of paper is changed or the printing magnification is varied.

On the other hand, when changing an embedded program of the image processing apparatus or adding a program thereto, a removable storage medium (removable memory) such as a USB memory is used. That is, a removable memory that stores a new program is connected to the image processing apparatus. Then, the image processing apparatus reads the new program from the removable memory and rewrites the embedded program. Moreover, when changing embedded parameters (settings of the size or direction of paper) for a lot of image processing apparatuses, a removable memory that stores new parameters is connected to the image processing apparatus. Then, the image processing apparatuses read the new parameters and rewrite the embedded parameters, thereby facilitating the operation.

For example, Japanese Patent Application Publication No. 2001-117778 discloses a USB device having a firmware rewriting function.

SUMMARY

Aspects of the present invention relate to a duplicate setting prevention system for an image processing apparatus, an image processing apparatus, a computer readable medium containing a duplicate setting prevention program, a duplicate setting prevention method and a combination of a removable memory and an image processing apparatus capable of preventing duplicate setting when changing setting of the image processing apparatus by means of a removable memory connected thereto.

In another aspect, the invention provides a duplicate setting prevention system, for an image processing apparatus, including a setting file, a set of history information, a determination unit, a setting unit, a prohibiting unit, and a history information recording unit. The setting file is stored in a removable memory removably mounted on an image processing apparatus and is for setting the image processing apparatus. The set of history information is stored in the removable memory and indicates that the image processing apparatus has been set based on the setting file. When the removable memory is mounted on the image processing apparatus; the determination unit reads out the history information set and determines that a setting has been performed to the image processing apparatus based on the setting file. The setting unit performs the setting to the image processing apparatus based on the setting file. The prohibiting unit prohibits the setting unit from performing the setting to the image processing apparatus when the determination unit determines that the setting has been performed to the image processing apparatus based on the setting file. The history information recording unit records, in the history information set of the removable memory, that the setting is performed to the image processing apparatus after the setting unit has completed the setting based on the setting file.

In another aspect of the invention, there is provided an image processing apparatus including a mounting section, a determination unit, a setting unit, a prohibiting unit, and a history information recording unit. The mounting section is capable of removably mounting a removable memory. The removable memory stores therein a setting file and a set of history information. The setting file is for setting the image processing apparatus. The history information set indicates that the image processing apparatus has been set based on the setting file. When the removable memory is mounted on the mounting section, the determination unit reads out the history information set and determines that a setting has been performed to the image processing apparatus based on the setting file. The setting unit performs the setting based on the setting file. The prohibiting unit prohibits the setting unit from performing the setting to the image processing apparatus when the determination unit determines that the setting has been performed to the image processing apparatus based on the setting file. The history information recording unit records, in the history information set of the removable memory, that the setting is performed to the image processing apparatus after the setting unit has completed the setting based on the setting file.

In another aspect of the invention, there is provided a computer readable medium containing a duplicate setting prevention program for instructing the image processing apparatus. The duplicate setting prevention program includes:

a program for detecting a removable memory that stores a setting file and a set of history information, the setting file being for setting the image processing apparatus, the history information set indicating that the image processing apparatus has been set based on the setting file;

a program for reading out the history information set when the detecting program detects the removable memory and for determining that a setting has been performed to the image processing apparatus based on the setting file;

a program for performing the setting based on the setting file;

a program for prohibiting the performing program from performing the setting to the image processing apparatus when it is determined that the setting has been performed to the image processing apparatus based on the setting file; and a program for recording, in the history information set of the removable memory, that the setting is performed to the image processing apparatus after the performing program has completed the setting based on the setting file.

In another aspect of the invention, there is provided a duplicate setting prevention method including:

detecting a removable memory that stores a setting file and a set of history information, the setting file being for setting the image processing apparatus, the history information set indicating that the image processing apparatus has been set based on the setting file;

reading out the history information set when the removable memory is detected and determining that a setting has been performed to the image processing apparatus based on the setting file;

prohibiting the setting to the image processing apparatus when it is determined that the setting has been performed to the image processing apparatus based on the setting file; and recording, in the history information set of the removable memory, that the setting is performed to the image processing apparatus after the setting has been completed based on the setting file.

In another aspect of the invention, there is provided a combination of a removable memory and an image processing apparatus. The combination includes a removable memory and an image forming apparatus. The removable memory stores therein a setting file and a set of history information. The setting file is for setting the image processing apparatus. The history information set indicates that the image processing apparatus has been set based on the setting file. The image forming apparatus includes a mounting section, a determination unit, a setting unit, a prohibiting unit, and a history information recording unit. The mounting section is capable of removably mounting the removable memory. When the removable memory is mounted on the mounting section, the determination unit reads out the history information set and determines that a setting has been performed to the image processing apparatus based on the setting file. The setting unit performs the setting based on the setting file. The prohibiting unit prohibits the setting to the image processing apparatus by the setting unit when the determination unit determines that the setting has been performed to the image processing apparatus based on the setting file. The history information recording unit records, in the history information set of the removable memory, that the setting is performed to the image processing apparatus after the setting unit has completed the setting based on the setting file.

BRIEF DESCRIPTION OF THE DRAWINGS

In the drawings:

FIG. 8 is a flowchart showing the duplicate setting prevention system (duplicate setting prevention program) for the image processing apparatus according to the embodiment of the present invention.

DETAILED DESCRIPTION

Now, a duplicate setting prevention system for an image processing apparatus, an image processing apparatus and a duplicate setting prevention program for the image processing apparatus according to a preferred embodiment of the present invention will be described with reference to the accompanying drawings. Hereinafter, a multifunction device having a facsimile function, a copying function and a scanning function is used as an example of the image processing apparatus. However, all of these functions are not required for putting the present embodiment into practice and an image processing apparatus having at least one of these functions will do.

Figure 1:
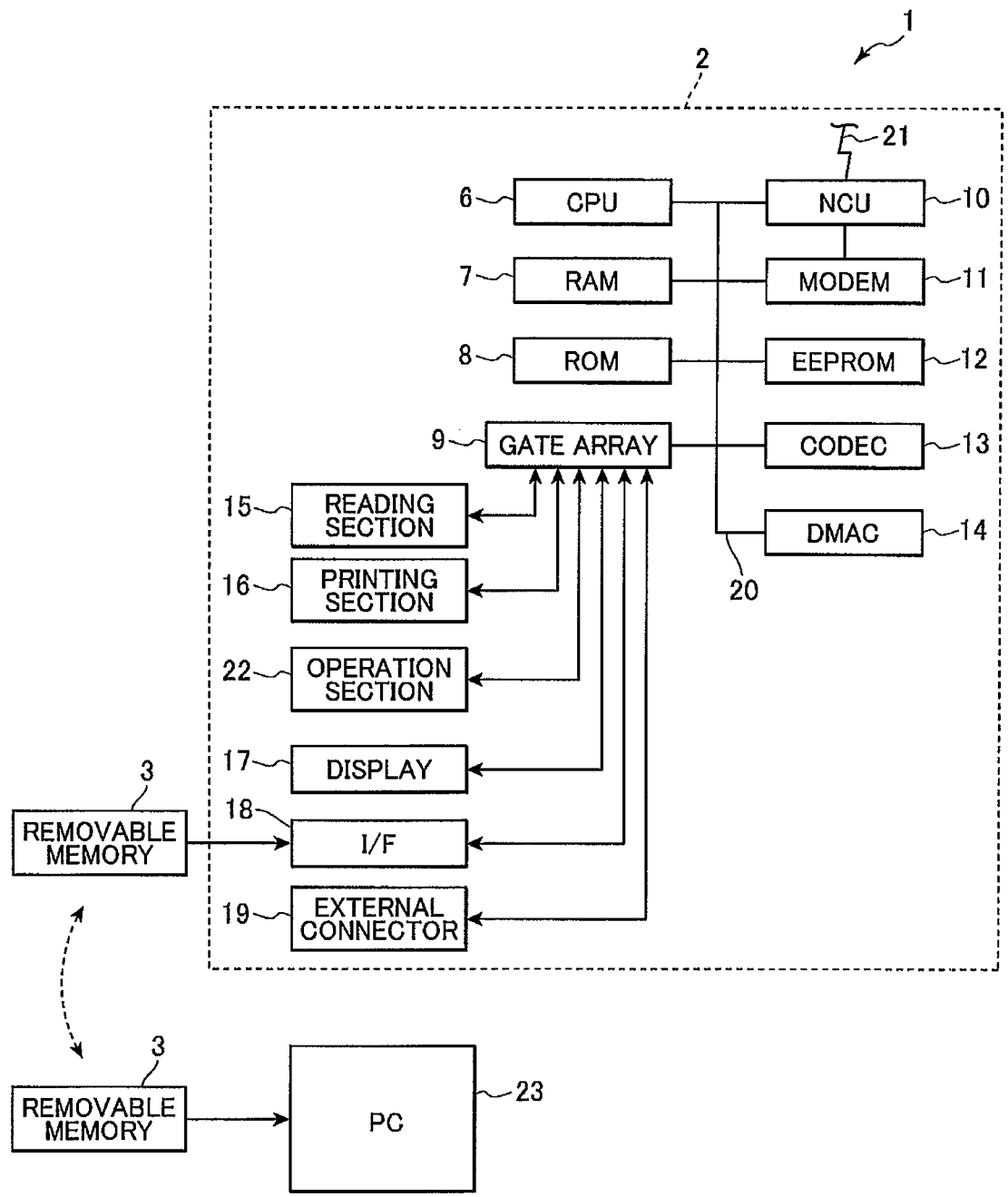
FIG. 1 is a block diagram showing an image processing apparatus according to an embodiment of the present invention.

FIG. 1 is a block diagram showing an image processing apparatus 2 of a duplicate setting prevention system 1. As shown in FIG. 1, the image processing apparatus 2 includes a CPU 6, a RAM 7, a ROM 8, a gate array 9, a NCU (Network Control Unit) 10, a modem 11, an EEPROM 12, a codec 13, and a DMAC (Direct Memory Access Controller) 14. These components are connected to each other by a bus line 20. The bus line 20 includes an address bus, a data bus and a control signal line. Further, a reading section 15, a printing section 16, an operation section 22, a display 17, an interface (I/F) 18, in which a removable memory 3 can be mounted, and an external connector 19 are connected to the gate array 9. A telephone line is connected to the NCU 10.

Figures 2, 3:
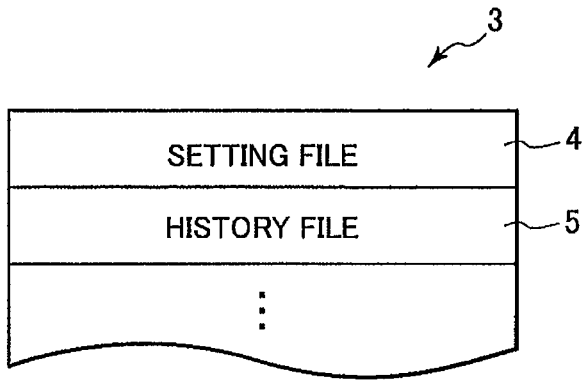
FIG. 2 is a schematic diagram showing information stored in a removable memory included in the image processing apparatus shown in FIG. 1.
FIG. 3 is a schematic diagram of a history file stored in the removable memory shown in FIG. 2.

The removable memory 3 is a storage medium, for example, such as a USB memory, a smart media, a compact flash (trademark registered) or a small HDD and can be removably mounted in the I/F 18. As shown in FIG. 2, the removable memory 3 stores a setting file 4 and a history file 5. The setting file 4 sets the size, direction of paper and the like for the image processing apparatus 2. Hence, the setting file 4 possesses parameters for setting the size, direction of paper and the like. The setting file 4 includes a set of first information identifying the contents of the settings uniquely. In the present embodiment, the first information is identical to a file name of the setting file 4. For example, GUID (globally unique identifier) is used as the file name of the setting file 4. GUID is an identifier specified uniquely all over the world. By using GUID, a different file name can be given each time the setting file 4 is created, thereby enabling the uniqueness of the setting file 4 to be improved.

On the other hand, the history file 5 stores the history of the image processing apparatus 2 set based on the setting file 4. FIG. 3 shows the data structure of the history file 5. The history file 5 includes a combination of the first information (file name 33 in the present embodiment) identifying the setting contents of the setting file 4 uniquely and a set of second information (serial number 34 in the present embodiment) identifying the image processing apparatus 2 uniquely. As described above, GUID is used as the file name 33 of the setting file 4. The serial number 34 is given by the manufacturer of the image processing apparatus 2 thereto and is a number identifying the image processing apparatus 2 uniquely.

In this manner, the history file 5 is composed of a pair of the first information (file name 33) identifying the setting file uniquely and the second information (serial number 34) identifying the image processing apparatus 2 uniquely. Therefore, the uniqueness of a set of history information for the history file 5 can be improved, enabling the prevention of duplicate setting for the image processing apparatus 2 certainly.

As described above, a different file name 33 is given each time the setting file 4 is created. When settings are executed on a plurality of image processing apparatuses, similar to the image processing apparatus 2, based on the setting file 4 stored in the removable memory 3, the history of the settings is recorded in the history file 5. For example, in FIG. 3, after the image processing apparatuses having the serial numbers "00001", "00002" and "00245" had been set by the file name [CD91D40A-B9D8-475f-92C0-BAD6D71E5792.set], the image processing apparatus having the serial number "00002" has been set by another file name [D155AE5A-5A9E-465b-AD18-B27AFF88365C.set]. Subsequently, seven image processing apparatuses having the serial number "00002" and the following serial numbers have been set by the file name [1BC7500D-C962-40c5-995A-6C104678B5F2.set].

The history file 5 may be stored in a storage medium (for example, EEPROM 12) in the image processing apparatus 2. However, if the history file 5 is stored in the EEROM 12, the free area of the EEROM 12 is reduced. Hence, the history file 5 is preferably stored in the removable memory 3 as in the present embodiment. In addition, the history file 5 stored in the removable memory 3 enables the uniform management of the histories of a plurality of image processing apparatuses.

Figure 4:
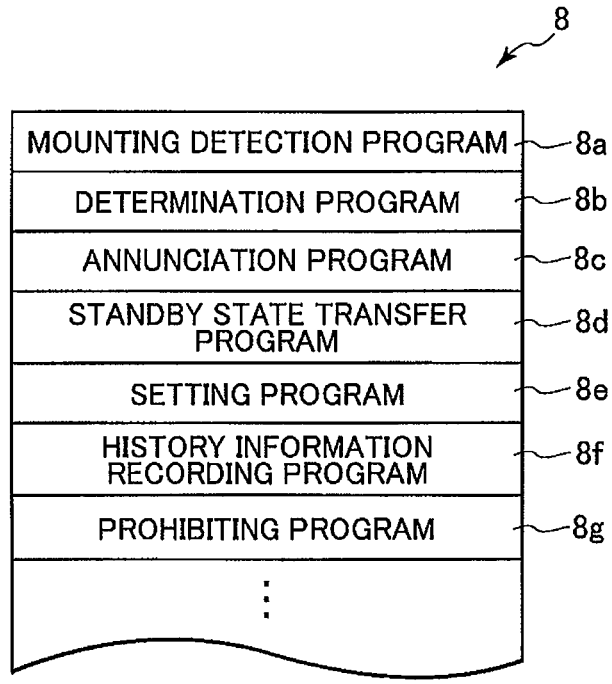
FIG. 4 is a view showing programs for constituting a duplicate setting prevention program stored in a ROM included in the image processing apparatus shown in FIG. 1.

As shown in FIG. 4, various programs such as a mounting detection program 8a, a determination program 8b, an annunciation program 8c, a standby state changing program 8d, a setting program 8e, a history information recording program 8f, and a prohibiting program 8g are stored in the ROM 8. The mounting detection program 8a, the determination program 8b, the annunciation program 8c, the standby state changing program 8d, the setting program 8e, the history information recording program 8f and the prohibiting program 8g compose the duplicate setting prevention program.

The mounting detection program 8a detects that the removable memory 3a has been mounted in the I/F 18. The determination program 8b reads out the history file 5 when the removable memory has been mounted and determines whether or not the setting based on the setting file 4 have been already executed on the image processing apparatus 2. More specifically, the determination program 8b reads out the first information (the file name 33) identifying the setting file 4 in the removable memory 3, and determines whether or not a pair of the first information and the second information (the serial number 34) identifying the image processing apparatus 2 has been already recorded in the history file 5. If the pair of the first information and the second information has been recorded in the history file 5, the setting based on the setting file 4 has been already executed on the image processing apparatus 2.

Moreover, when the setting based on the setting file 4 has been already executed, the annunciation program 8c annunciates that the setting based on the setting file 4 have been already executed. After the annunciation, the image processing apparatus 2 is changed into a standby state. When the setting based on the setting file 4 has not been executed, the setting program 8e reads out the setting file 4 and executes setting on the image processing apparatus 2. The history information recording program 8f is a program for recording that the setting based on the setting file 4 has been executed in the history file 5 of the removable memory 3. The prohibiting program 8g prohibits the setting based on the setting file 4 to the image processing apparatus 2 when the setting based on the setting file 4 has been executed. Each of the programs 8a through 8g is executed by the CPU 6.

The NCU 10 shown in FIG. 1 is connected to the public telephone line 21 and performs network control such as connection/disconnection of the public telephone line 21. Moreover, the RAM 7 is used as a line buffer memory for the work area of the CPU 6 and the expansion area of read images. The modem 11 modulates and demodulates facsimile data. The ROM 8 stores data such as the various programs 8a through 8f shown in FIG. 4, setting value and the like. The codec 13 codes and decodes facsimile data. The DMCA 14 writes and reads data mainly to/from the RAM 7.

The gate array 9 functions as an input/output interface to the CPU 6 and the reading section 15 and the like. The reading section 15 is provided with an image sensor and a LED light source and reads images such as characters and figures from documents. The printing section 16 prints out the images of characters and figures, for example, by means of ink-jet method or laser-method. The operation section 22 is provided with a group of key switches such as numeric keypad and character keypad and transmits instructions to the CPU 6 according to key operations by a user. The display 17 is provided with a panel such as LCD and displays operation states, operation guidance and reduced-size images. The external connector 19 is provided with connection ports conforming to the standards such as Centronics parallel interfaces and USBs (Universal Serial Buses).

Figure 5:
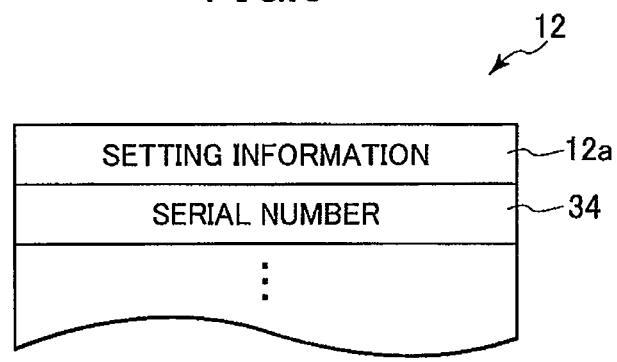
FIG. 5 is a view showing information stored in an EEPROM included in the image processing apparatus shown in FIG. 1.

As shown in FIG. 5, a set of setting information 12a and a serial number 34 are stored in the EEPROM 12. The setting information 12a is information regarding setting of the image processing apparatus 2 and is rewritten when adding the setting. As described above, the serial number 34 is information for identifying the respective image processing apparatuses 2.

Figure 6:
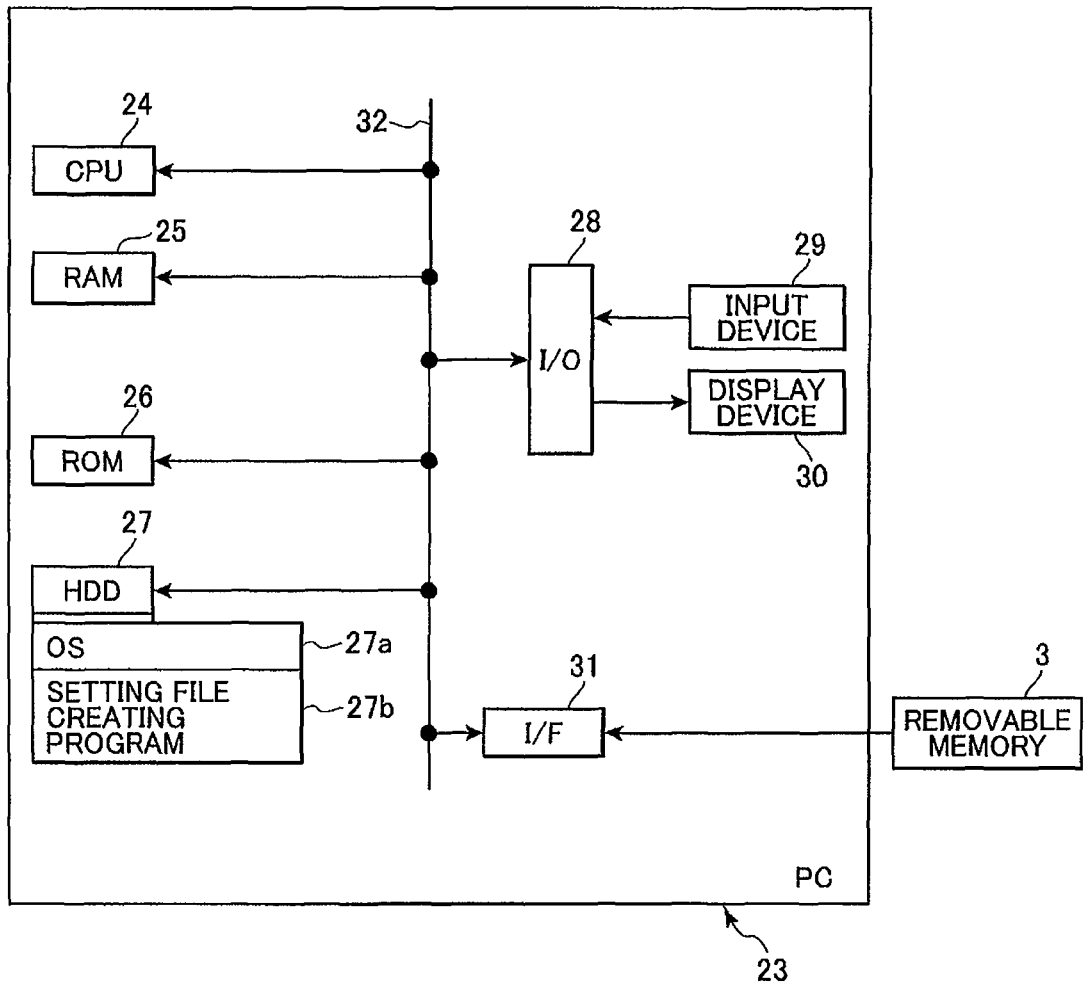
FIG. 6 is a block diagram showing a personal computer shown in FIG. 1.

The block diagram of a personal computer (PC) 23 is shown in FIG. 6. The PC 23 includes a CPU 24, a RAM 25, a ROM 26, a HDD 27, an I/O 28, an I/F 31, and a bus line 32 connecting these to each other. An input device 29 such as a keyboard and a display device 30 such as a liquid crystal panel are connected to the I/O 28. Moreover, the removable memory 3 can be mounted in the I/F 31.

An OS 27a and a setting file creation program 27b are stored in the HDD 27. The OS 27a is base software of the PC 23 and a program (not shown) for creating GUID is incorporated in the OS 27a. The setting file creation software 27b is a program for creating the setting file 4. The CPU 24 executes the setting file creation program 27b.

Figure 7:
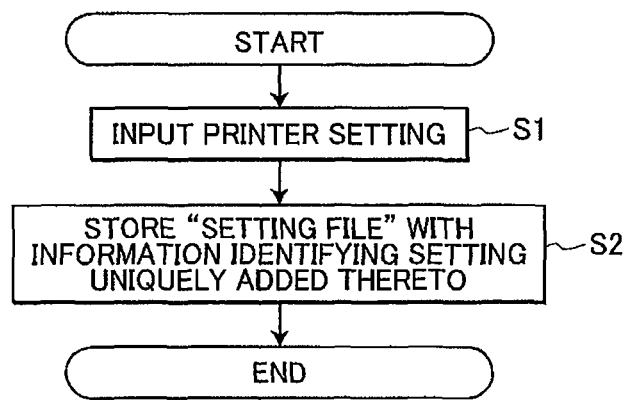
FIG. 7 is a flowchart showing the procedure of creating a setting file by means of a setting file creation program in the personal computer shown in FIG. 1.

FIG. 7 is a flowchart showing the procedure of creating the setting file 4 by means of the setting file creation program 27b in the PC 23. In S1 at the beginning of the setting file creation program 27b, a user inputs the setting of a printer by means of the input device 29. Subsequently, in S2, information identifying the setting uniquely is added to the setting inputted by the user, and the setting file 4 is stored in the removable memory 3. For example, by using GUID, a file name 33 is given to the setting file 4. Then, the CPU 24 ends the setting file creation program 27b.

Next, the duplicate setting prevention system of the image processing apparatus 2 (duplicate setting prevention program: mounting detection program 8a, determination program 8b, annunciation program 8c, standby state changing program 8d, setting program 8e, history information recording program 8f, and prohibiting program 8g) will be described with reference to the flowchart shown in FIG. 8. The flowchart is executed whenever the printer is in the standby state. In S3 at the beginning of the duplicate setting prevention program, the CPU 6 determines whether or not the removable memory 3 has been inserted into the I/F 18. When the removable memory 3 has not been inserted (s3: NO), the CPU 6 ends the duplicate setting prevention program. That is, the CPU 6 returns the image processing apparatus 2 in the standby state. If the removable memory 3 has been inserted (S3: YES), the CPU 6 advances to S4.

In S4, the CPU 6 determines whether or not the setting file 4 is present in the removable memory 3. If the setting file 4 is not present in the removable memory (S4: NO), the CPU 6 ends the duplicate setting prevention program. If the setting file 4 is present in the removable memory (S4: YES), the CUP 6 advances to S5. In S5, the CUP 6 determines whether or not the setting has been performed based on the setting file 4 existing in the removable file 3. Particularly, the CPU 6 determines whether or not the pair of the second information (serial number 34) identifying the image processing apparatus 2 and the file name 33 (the first information) of the setting file 4 in the removable memory 3 has been recorded in the history file 5 (refer to FIG. 3). If the pair of the serial number 34 of the image processing apparatus 2 and the file name 33 of the setting file 4 has been recorded in the history file 5, the CPU 6 determines that the pair has been already set in the image processing apparatus (S5: YES). If not recorded, the CPU 6 determines that the pair has not been set in the image processing apparatus (5: NO).

If the pair of the serial number 34 of the image processing apparatus 2 and the file name 33 of the setting file 4 has been already set in the history file 5 (S5: YES), in S8 the CPU 6 annunciates that a duplicate setting is tried to be performed. For example, a warning is displayed on the display 17 or a sound warning is given. This warning enables the prevention of the duplicate setting. In addition, the user can become aware of his/her wrong setting operation. After having performed the annunciation in S8, the CPU 6 returns the image processing apparatus 2 in the standby state without displaying a setting screen in the display 17. That is, the CPU 6 prohibits the setting for the image processing apparatus 2 based on the setting file 4 when the setting has ever been performed to the image processing apparatus 2. Therefore, the wrong setting operation can be prevented.

If the pair of the serial number 34 of the image processing apparatus 2 and the file name 33 of the setting file 4 has not been recorded in the history file 5 (S5: NO), the setting for the image processing apparatus 2 is performed based on contents of the setting file 4 in S6. That is, the setting file 4 stored in the removable memory 3 is read out, and the setting information 12a (refer to FIG. 5) stored in the EEPROM 12 is rewrited.

Then, in S7, the CPU 6 records in the history file 5 that the image processing apparatus 2 has been already set based on the setting file 4. That is, the file name 33 in the setting file 4 and the serial number 34 of the image processing apparatus 2 are recorded as a pair in the history file 5. Thereby, if the same image processing apparatus 2 is tried to be set based on the same setting file 4, the annunciation of the warning can be given to the user.

As described above, according to the present embodiment, the setting file 4 and the history file 5 are stored in the removable memory 3. When the removable memory 3 has been mounted in the image processing apparatus 2, a determination is made as to whether or not the pair of the information (file name 33) identifying the setting file 4 and the information (serial number 34) identifying the image processing apparatus 2 has been recorded in the history file 5. When the pair has been recorded, the annunciation thereof is given to the user, thereby enabling the prevention of the duplicate setting.

What is claimed is:

1. An image processing apparatus, comprising:
 a mounting section configured to receive removable mounting of a removable memory, the removable memory storing therein a setting file and history information, the setting file configured for setting the image processing apparatus, the history information including a combination of first information uniquely identifying the image processing apparatus and second information identifying the setting file, the history information indicating whether the image processing apparatus has been set based on the setting file;
 a storing portion pre-storing identification information uniquely identifying the image processing apparatus;
 a processor; and
 memory storing machine readable instructions that, when executed by the processor, cause the image processing apparatus to:
  read out the first information included in the history information already stored in the removable memory, when the removable memory is mounted on the mounting section,
  determine that a setting has been performed to the image processing apparatus based on the setting file already stored in the removable memory when the first information read out from the removable memory is the same as the identification information pre-stored in the storing portion;
  determine that the setting has not been performed to the image processing apparatus based on the setting file already stored in the removable memory when the first information read out from the removable memory is different from the identification information pre-stored in the storing portion;
  perform the setting based on the setting file already stored in the removable memory to the image processing apparatus, when determining that the setting has not been performed to the image processing apparatus based on the setting file already stored in the removable memory;
  record new history information indicating that the image processing apparatus has been set based on the setting file already stored in the removable memory, in the removable memory, after completing the setting based on the setting file already stored in the removable memory, the new history information including a combination of third information and fourth information, the third information being the same as the identification information pre-stored in the storing portion, the fourth information identifying the setting file based on which the setting is performed to the image processing apparatus; and
  prohibit, after recording the new history information in the removable memory, performance of the setting based on the setting file already stored in the removable memory to the image processing apparatus when determining that the setting has been performed to the image processing apparatus based on the setting file already stored in the removable memory.

2. The image processing apparatus according to claim 1, wherein the machine readable instructions, when executed, further cause the image processing apparatus to:
 annunciate that the setting has been already performed to the image processing apparatus when it is determined that the setting has been performed based on the setting file.

3. A non-transitory computer readable medium storing computer readable instructions that, when executed, cause an image processing apparatus, including a storing portion pre-storing identification information uniquely identifying the image processing apparatus, to:
 detect a removable memory that stores a setting file and history information, the setting file configured for setting the image processing apparatus, the history information including a combination of first information uniquely identifying the image processing apparatus and second information identifying the setting file, the history information indicating whether the image processing apparatus has been set based on the setting file;

read out the first information included in the history information already stored in the removable memory, when the removable memory is mounted on the mounting section;

determine that a setting has been performed to the image processing apparatus based on the setting file already stored in the removable memory when the first information read out from the removable memory is the same as the identification information pre-stored in the storing portion;

determine that the setting has not been performed to the image processing apparatus based on the setting file already stored in the removable memory when the first information read out from the removable memory is different from the identification information pre-stored in the storing portion;

perform the setting based on the setting file already stored in the removable memory to the image processing apparatus, when determining that the setting has not been performed to the image processing apparatus based on the setting file already stored in the removable memory;

record new history information indicating that the image processing apparatus has been set based on the setting file already stored in the removable memory, in the removable memory, after completing the setting based on the setting file already stored in the removable memory, the new history information including a combination of third information and fourth information, the third information being the same as the identification information pre-stored in the storing portion, the fourth information identifying the setting file based on which the setting is performed to the image processing apparatus; and prohibit, after recording the new history information in the removable memory, performance of the setting based on the setting file already stored in the removable memory to the image processing apparatus when it is determined that the setting has been performed to the image processing apparatus based on the setting file already stored in the removable memory.

4. The non-transitory computer readable medium according to claim 3, wherein the computer readable instructions, when executed, further cause the image processing apparatus to:

annunciate that the setting has been already performed to the image processing apparatus when determining that the setting has been performed based on the setting file.

5. A duplicate setting prevention method comprising:

detecting a removable memory that stores a setting file and history information, the setting file configured for setting an image processing apparatus including a storing portion pre-storing identification information uniquely identifying the image processing apparatus, the history information including a combination of first information uniquely identifying the image processing apparatus and second information identifying the setting file, the history information indicating whether the image processing apparatus has been set based on the setting file;

reading out the first information included in the history information when mounting of the removable memory is detected;

determining that a setting has been performed to the image processing apparatus based on the setting file already stored in the removable memory when the first information read out from the removable memory is the same as the identification information pre-stored in the storing portion;

determining that the setting has not been performed to the image processing apparatus based on the setting file already stored in the removable memory when the first information read out from the removable memory is different from the identification information pre-stored in the storing portion;

performing the setting based on the setting file already stored in the removable memory to the image processing apparatus, when determining that the setting has not been performed to the image processing apparatus based on the setting file already stored in the removable memory;

record new history information indicating that the image processing apparatus has been set based on the setting file already stored in the removable memory, in the removable memory, after completing the setting based on the setting file already stored in the removable memory, the new history information including a combination of third information and fourth information, the third information being the same as the identification information pre-stored in the storing portion, the fourth information identifying the setting file based on which the setting is performed to the image processing apparatus; and prohibiting, after recording the new history information in the removable memory, performance of the setting based on the setting file already stored in the removable memory to the image processing apparatus when it is determined that the setting has already been performed to the image processing apparatus based on the setting file already stored in the removable memory.

6. The duplicate setting prevention method according to claim 5, further comprising:

annunciating that the setting has been already performed to the image processing apparatus when it is determined that the setting has been performed based on the setting file.

* * * * *